United States Patent
Hulsman

(10) Patent No.: US 8,911,117 B2
(45) Date of Patent: Dec. 16, 2014

(54) LED LIGHTING APPARATUS WITH A HIGH EFFICIENCY CONVECTIVE HEAT SINK

(76) Inventor: Mike Hulsman, Saint Anthony, IN (US)

(*) Notice: Subject to any disclaimer, the term of this patent is extended or adjusted under 35 U.S.C. 154(b) by 185 days.

(21) Appl. No.: 13/558,678

(22) Filed: Jul. 26, 2012

(65) Prior Publication Data

US 2013/0049595 A1 Feb. 28, 2013

Related U.S. Application Data

(60) Provisional application No. 61/572,979, filed on Jul. 26, 2011.

(51) Int. Cl.
 *F21V 29/00* (2006.01)
 *H05B 37/02* (2006.01)
 *F21V 29/02* (2006.01)

(52) U.S. Cl.
 CPC ............ *H05B 37/0218* (2013.01); *F21V 29/02* (2013.01); *F21V 29/225* (2013.01); *F21V 29/2262* (2013.01); *Y02B 20/46* (2013.01); *Y02B 20/72* (2013.01)
 USPC ............................. 362/294; 362/253; 362/373

(58) Field of Classification Search
 USPC .................... 362/96, 253, 294, 241, 373, 800
 See application file for complete search history.

(56) References Cited

U.S. PATENT DOCUMENTS

| | | | |
|---|---|---|---|
| 6,864,513 B2 | 3/2005 | Lin et al. | |
| 7,586,126 B2 | 9/2009 | Yang et al. | |
| 7,726,844 B2 | 6/2010 | Chen | |
| 7,837,363 B2 | 11/2010 | Liu | |
| 7,874,710 B2 | 1/2011 | Tsai et al. | |
| 8,016,457 B2* | 9/2011 | Clark et al. | 362/294 |
| 2004/0120156 A1* | 6/2004 | Ryan | 362/373 |
| 2005/0152146 A1* | 7/2005 | Owen et al. | 362/294 |
| 2009/0097243 A1 | 4/2009 | Lan et al. | |
| 2009/0160344 A1 | 6/2009 | Hsu et al. | |
| 2009/0184619 A1 | 7/2009 | Lai | |
| 2009/0323361 A1 | 12/2009 | Liu | |
| 2010/0014289 A1* | 1/2010 | Thomas et al. | 362/235 |
| 2010/0085759 A1* | 4/2010 | O'Sullivan et al. | 362/294 |
| 2011/0025211 A1 | 2/2011 | Bae | |
| 2011/0042056 A1 | 2/2011 | Bae | |
| 2011/0051453 A1 | 3/2011 | Nagasawa et al. | |
| 2011/0249441 A1* | 10/2011 | Donegan | 362/253 |

FOREIGN PATENT DOCUMENTS

CN 101608760 A 12/2009

\* cited by examiner

*Primary Examiner* — Tung X Le
(74) *Attorney, Agent, or Firm* — Krieg DeVault LLP

(57) ABSTRACT

An LED lighting apparatus including an LED chip having at least one LED, a light reflector configured to direct light emitted by the LED at a predetermined direction and dispersion angle, a heat sink including a mounting base and cooling fins extending from a first side of the mounting base and with the LED chip secured to an opposite second side of the mounting base, a cooling fan attached to the heat sink adjacent distal ends of the plurality of fins, an electrical regulator electrically connected to the cooling fan to provide regulated power to the cooling fan, an LED driver electrically connected to the LED chip, and a thermal limit switch mounted to the heat sink and configured to cut off power to the LED chip if a sensed temperature of the heat sink exceeds a temperature set point to thereby provide thermal protection to the LED chip.

20 Claims, 10 Drawing Sheets

LED LIGHTING APPARATUS WITH A HIGH EFFICIENCY CONVECTIVE HEAT SINK

CROSS REFERENCE TO RELATED APPLICATIONS

The present application claims the benefit of U.S. Provisional Patent Application Ser. No. 61/572,979 filed Jul. 26, 2011, the contents of which are incorporated herein by reference in their entirety.

FIELD OF THE INVENTION

The present invention generally relates to the field of LED lighting, and more specifically relates to LED lighting apparatus having a high efficiency convective heat sink.

BACKGROUND

Lighting sources utilizing light emitting diodes (LEDs) are widely used in the field of illumination due to their high brightness/intensity, long lifespan, and wide array of available color options. LEDs emit visible light at a specific wavelength range and generate a significant amount of heat. Generally, a large portion of the electric energy consumed by LEDs is converted to heat, with the remaining electric energy converted to light. If the generated heat cannot be effectively dissipated, the LEDs may overheat, and performance and lifespan of the LEDs may be greatly reduced.

What is therefore needed is LED lighting apparatus that includes a highly efficient and effective heat-dissipating apparatus which can overcome the above-described shortcomings of conventional LED lighting. The present invention satisfies this need and provides other benefits and advantages.

DESCRIPTION OF THE PREFERRED EMBODIMENTS

Figure 1:
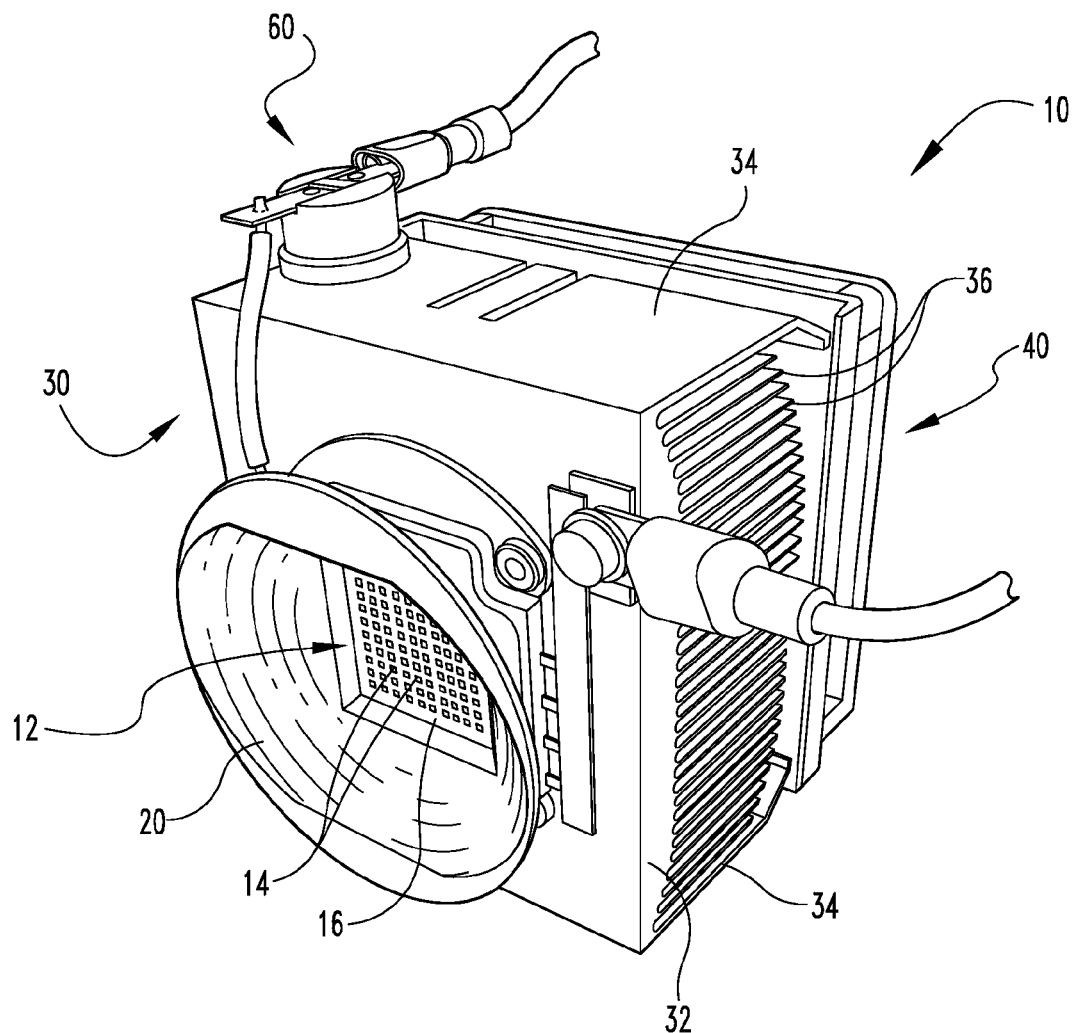
FIG. 1 is a perspective view of an LED lighting apparatus according to one form of the present invention.
Figure 2:
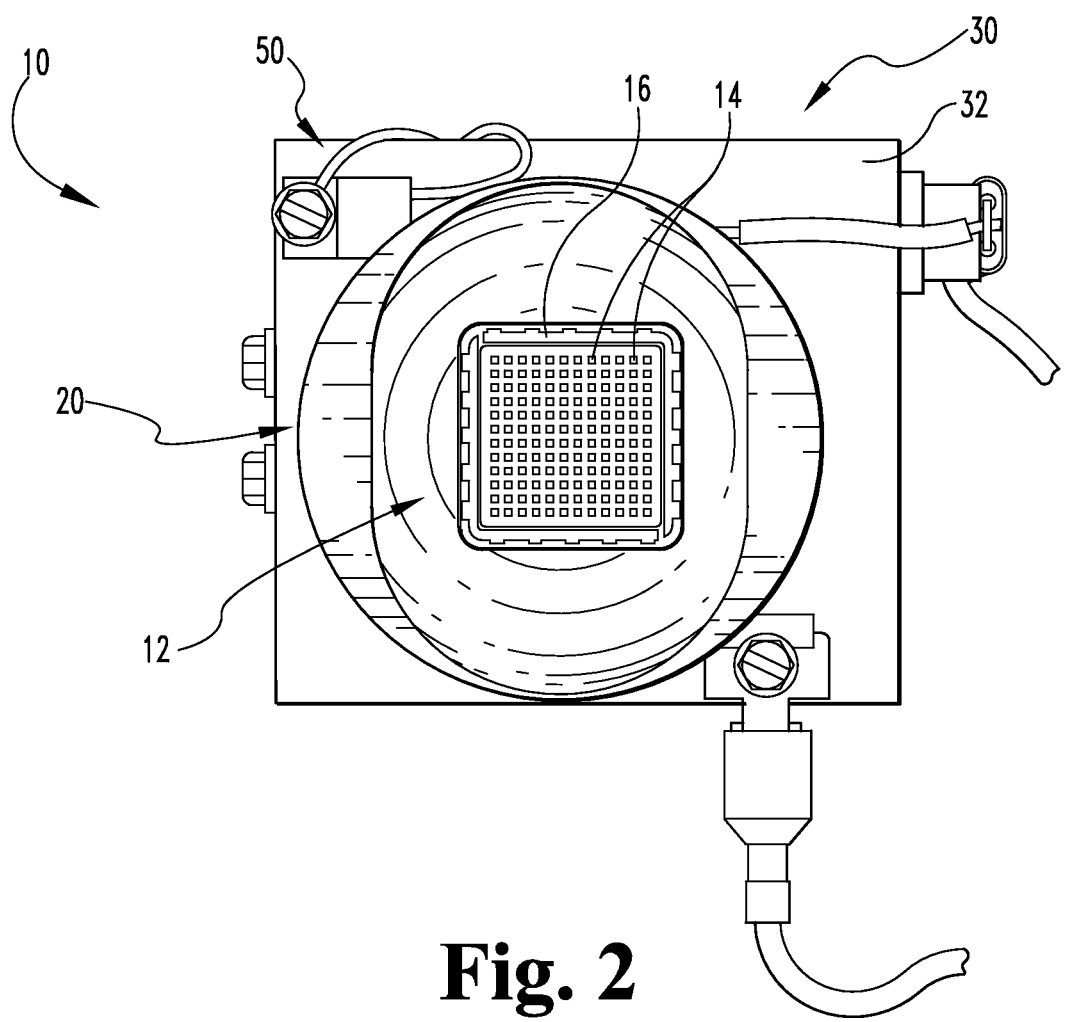
FIG. 2 is a top plan view of the LED lighting apparatus illustrated in FIG. 1.
Figure 3:
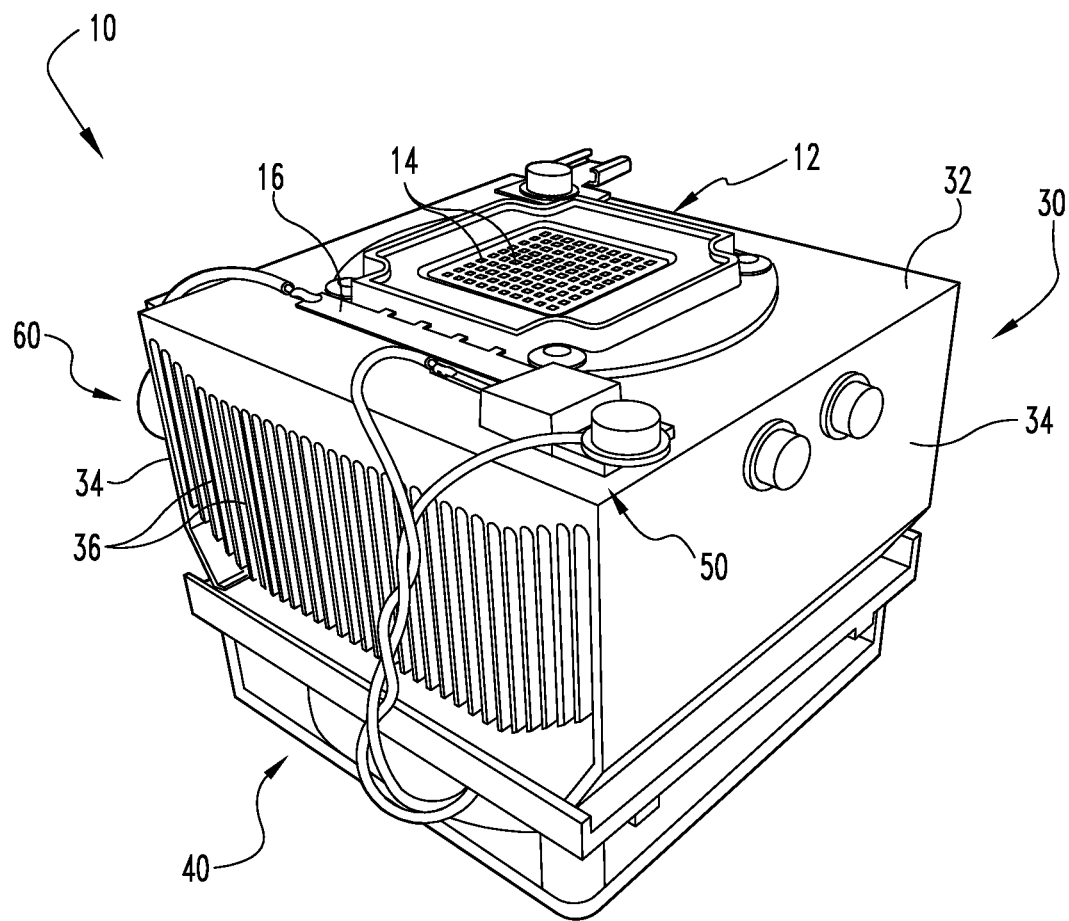
FIG. 3 is a side perspective view of the LED lighting apparatus illustrated in FIG. 1 without the reflector device.
Figure 4:
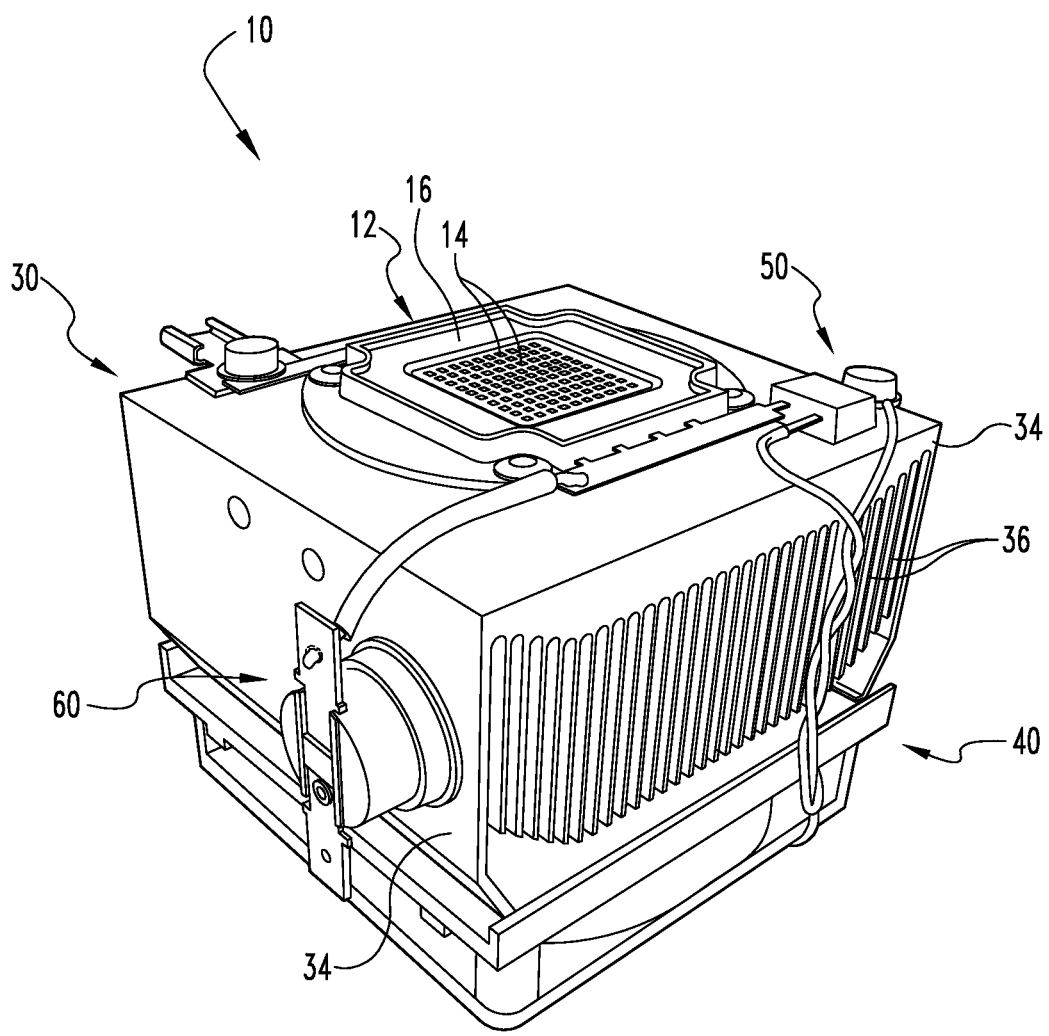
FIG. 4 is a side perspective view of the LED lighting apparatus illustrated in FIG. 1 without the reflector device.
Figure 5:
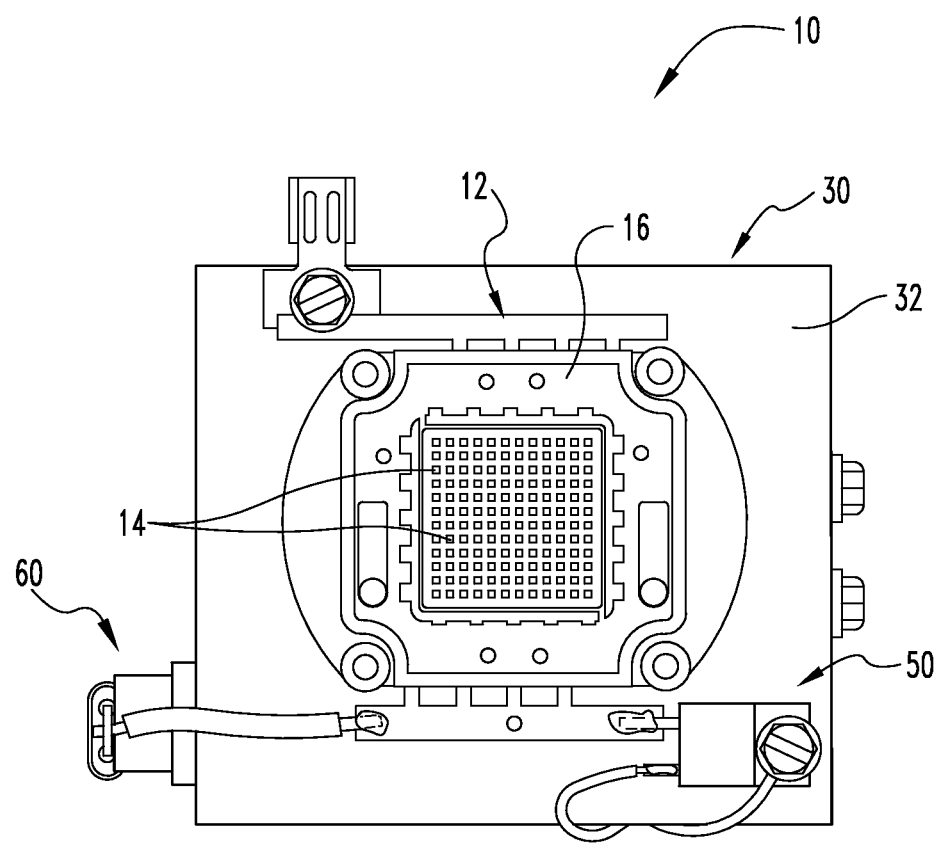
FIG. 5 is a top plan view of the LED lighting apparatus illustrated in FIG. 1 without the reflector device.
Figure 6:
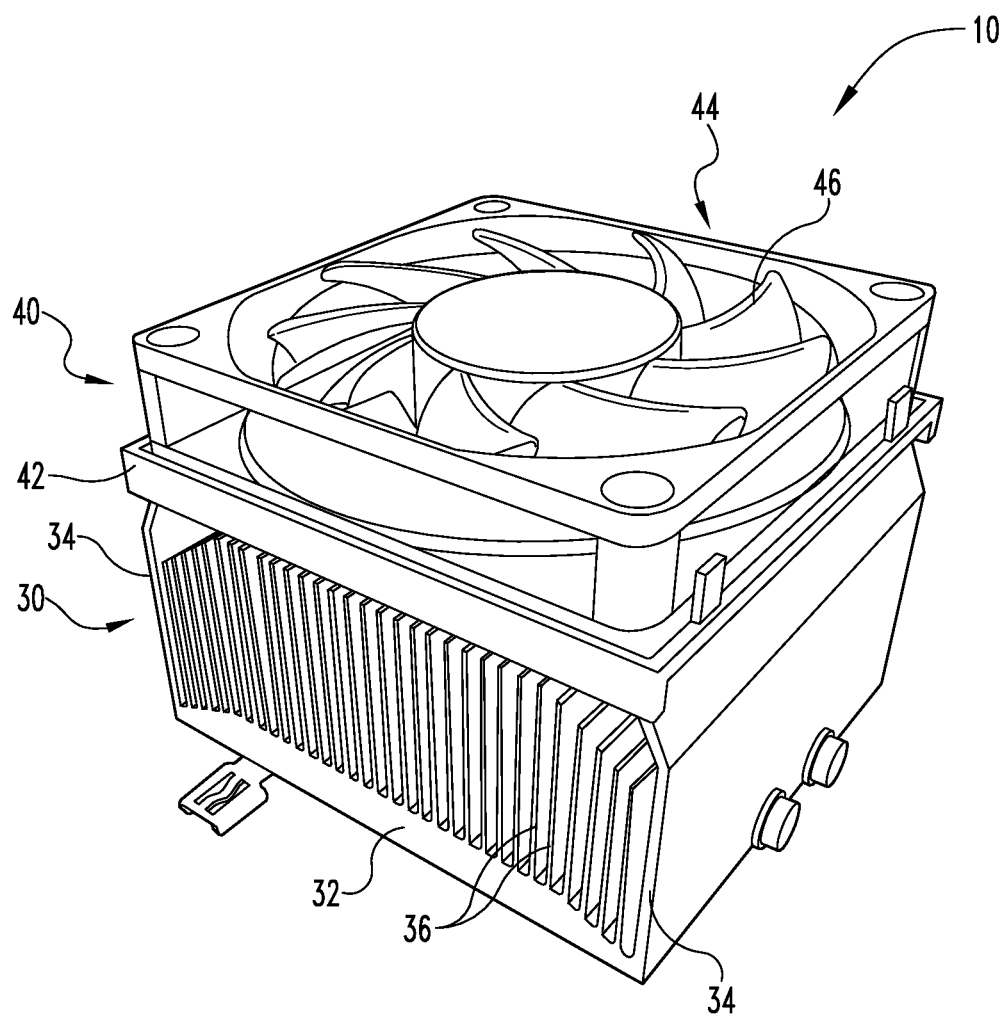
FIG. 6 is a side perspective view of the LED lighting apparatus illustrated in FIG. 1.
Figure 7:
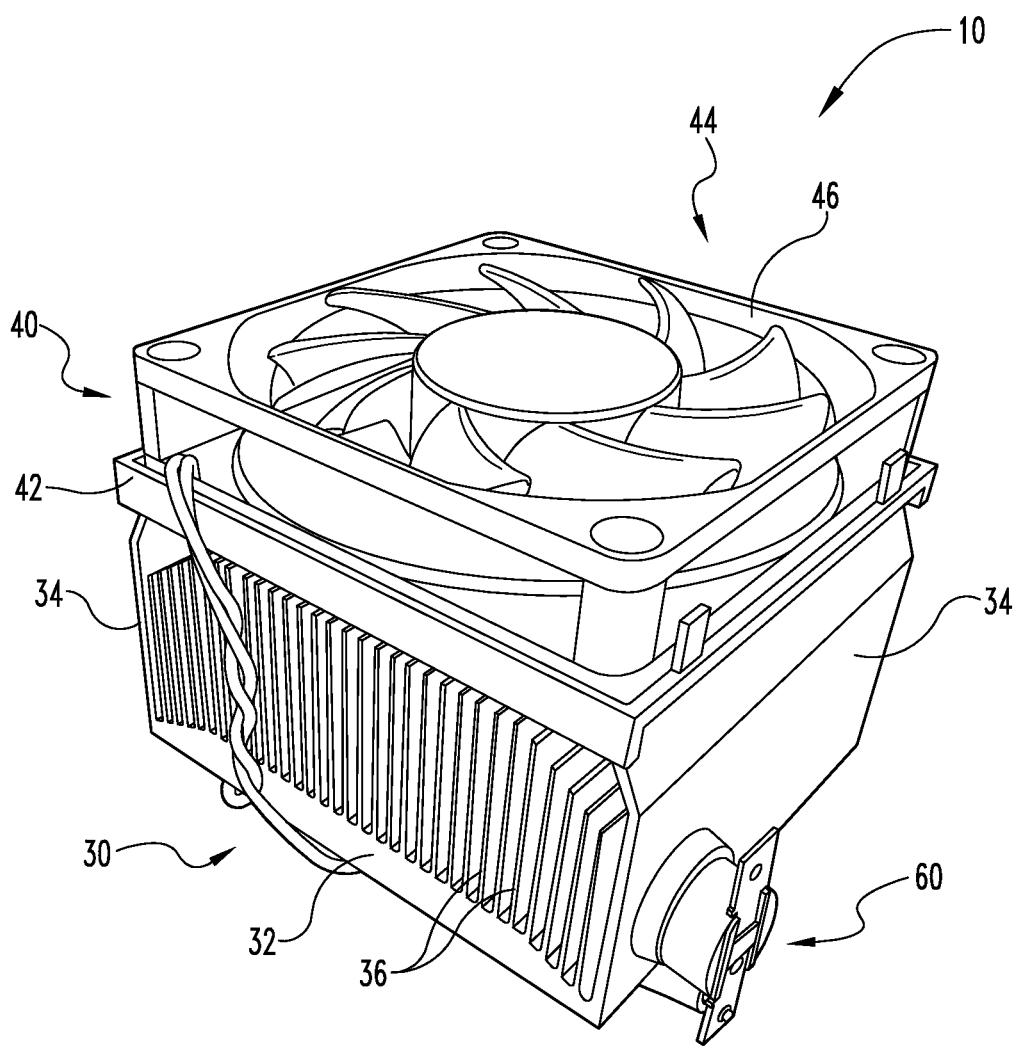
FIG. 7 is a side perspective view of the LED lighting apparatus illustrated in FIG. 1.
Figure 8:
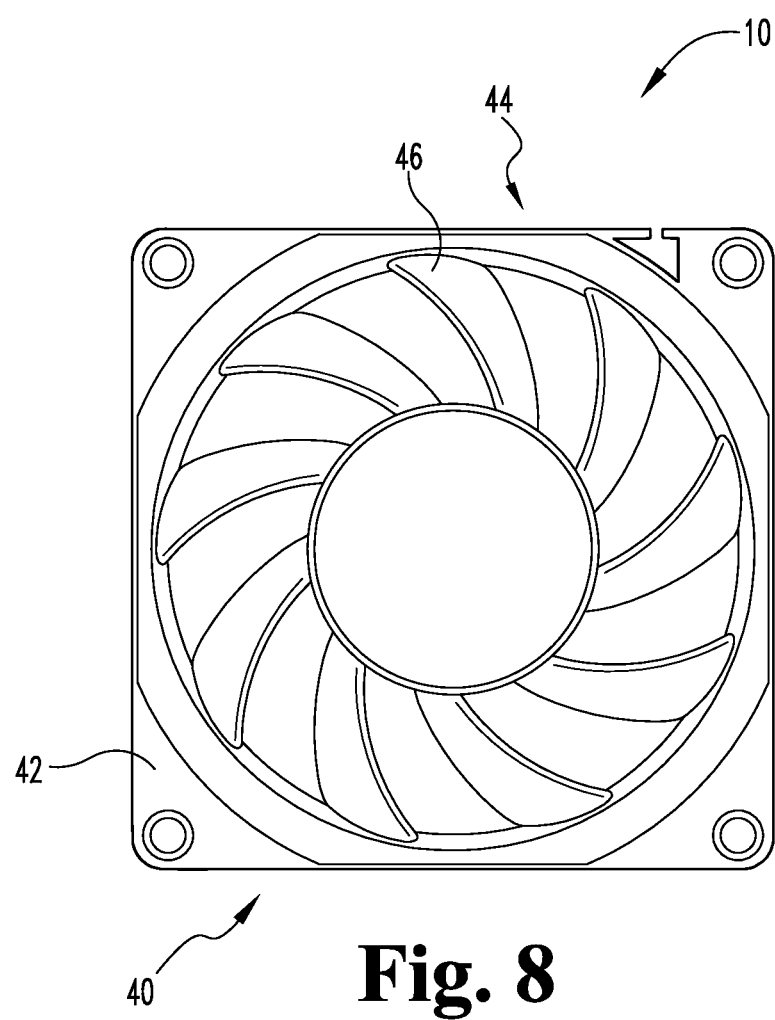
FIG. 8 is a bottom plan view of the LED lighting apparatus illustrated in FIG. 1.
Figure 9:
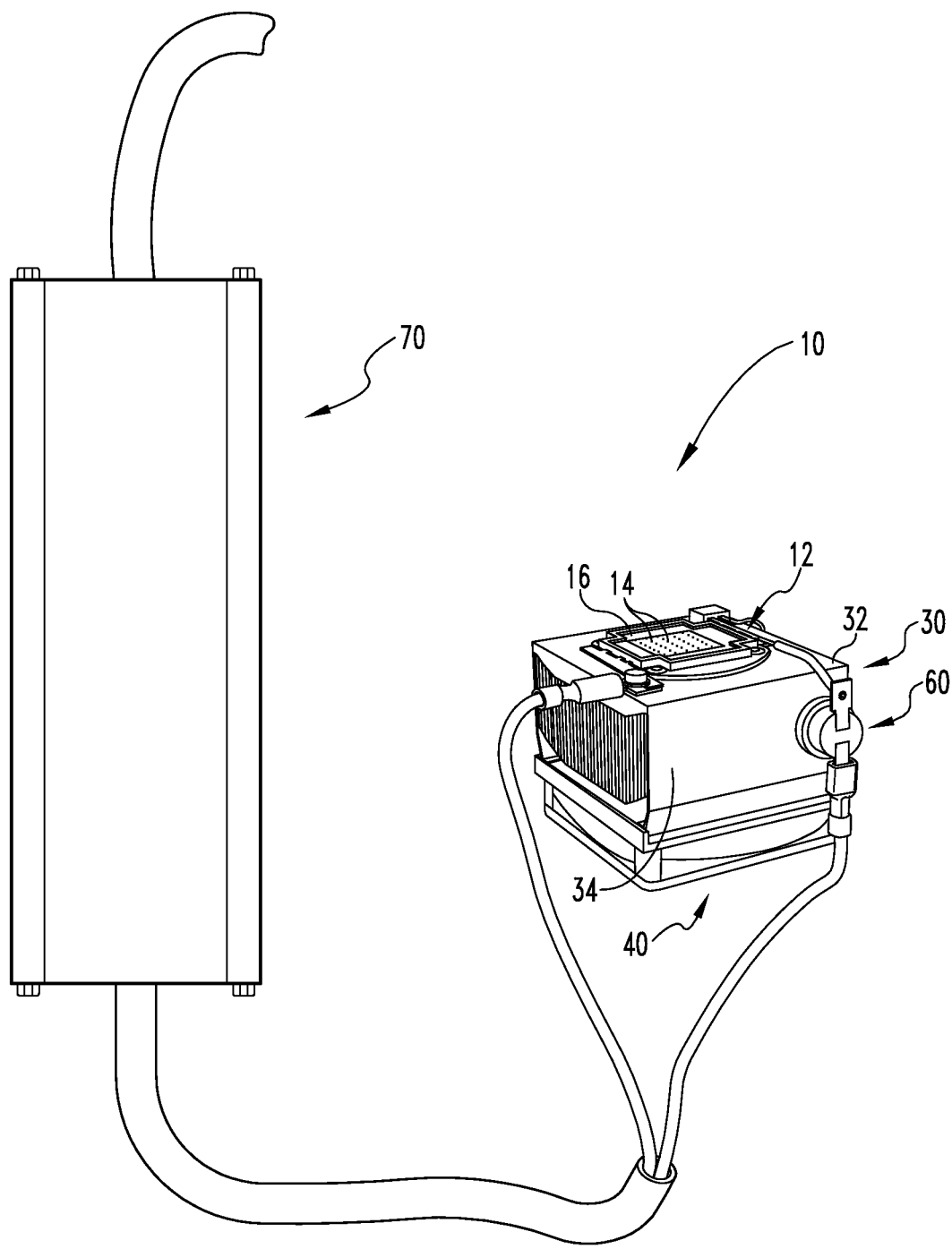
FIG. 9 is a side perspective view of the LED lighting apparatus illustrated in FIG. 1 without the reflector device and shown coupled to an LED electronic driver.

For the purposes of promoting an understanding of the principles of the invention, reference will now be made to the embodiments illustrated in the drawings and specific language will be used to describe the same. It will nevertheless be understood that no limitation on the scope of the invention is hereby intended, and that alterations and further modifications in the illustrated devices and further applications of the principles of the invention as illustrated herein are contemplated as would normally occur to one skilled in the art to which the invention relates.

Referring to FIGS. 1-10, shown therein is an LED lighting apparatus 10 according to one form of the present invention. The LED lighting apparatus 10 is generally comprised of an LED chip 12, a light reflector 20, a heat sink 30, a cooling fan 40, an electrical regulator 50, a thermal limit switch 60, and an LED driver or power supply 70. In one embodiment, the assembled LED lighting apparatus 10 including the LED chip 12, the light reflector 20, the heat sink 30, the cooling fan 40, the electrical regulator 50, and the thermal limit switch 60 weighs under 10 ounces, which is considerably lighter than conventional LED lighting devices which can weigh up to 30 pounds or more. In one embodiment, the LED lighting apparatus 10 is used in association with street lights. However, in other embodiments, the LED lighting apparatus 10 may be used in association with 2'×2' lighting structures for drop ceilings, strip lighting structures, high bay lighting structures, or any other conventional lighting structure.

The LED chip 12 includes at least one LED 14 mounted to a board or mounting structure 16, and with the light reflector 20 operatively attached to the LED chip 12 to direct/focus the light emitted by the LEDs 14 at a predetermined direction and angle (i.e., in a predetermined light dispersion pattern). The LEDs 14 may be provided in a variety of colors including, for example, soft white, white, red, green, blue, yellow, or any other color know to those having ordinary skill in the art. The LED chip 12 may have a power rating from 10 watts to 100 watts. However, LED chips having lower or higher power ratings are also contemplated. A 30 watt LED chip provides light that is generally equivalent to a 100 watt metal halide lamp, but also operates at a significantly higher efficiency (e.g., uses approximately 68% less electricity). A 50 watt LED chip provides light that is generally equivalent to a 175 watt pulse metal halide lamp, but operates at a significantly higher efficiency (e.g., uses approximately 68% less electricity). A 100 watt LED chip provides light that is generally equivalent to a 400 watt metal halide lamp, but likewise operates at a significantly higher efficiency (e.g., uses approximately 68% less electricity). The LED chip 12 is generally rated at 70% efficiency at 100,000 hours of use, which means that burning the LED lighting apparatus for ten hours per day would equate to a 27 year life span while maintaining an efficiency rating of at least 70%. However, the configuration of the heat sink 30 and the cooling fan 40 is estimated to prolong the life span of the LED chip 12 while maintain a 70% efficiency rating at 148,000 hours of use.

The heat sink 30 includes an LED mounting base 32, a pair of outer mounting legs 34 extending laterally from the mounting base 32, and a plurality of fins 36 extending laterally from the mounting base 32 and positioned between the mounting legs 34. In the illustrated embodiment, the length of the fins 36 is shorter adjacent the ends of the heat sink 30 (i.e., adjacent the mounting legs 34), and gradually increase in length toward the central portion of the heat sink 30. This configuration tends to increase the rate of convective heat transfer between the heat sink 30 and the surrounding air, thereby increasing the thermal efficiency of the heat sink 30. The LED chip 12 is mounted to the mounting base 32 of the heat sink 30 to provide thermal heat transfer of the heat generated by the LEDs 14 to the heat sink 30. Thermal grease (not shown) may be positioned at the interface between the LED chip 12 and the heat sink 30 to facilitate conductive heat transfer therebetween.

The cooling fan 40 includes a mounting base 42 operatively attached to the mounting legs 34 of the heat sink 30, and a rotary fan 44 rotationally connected to the mounting base 42 and including a plurality of fan blades 46. The cooling fan 40 cooperates with the heat sink 30 to provide convective heat transfer between the heat sink 30 (and more specifically the fins 36) and the surrounding air to effectively and efficiently dissipate heat generated by the LED chip 12. In the illustrated embodiment, the cooling fan 40 is positioned adjacent but spaced from the ends of the fins 36 of the heat sink 30. In one embodiment, the cooling fan 40 operates to draw air into the space between the fins 36 to promote convective heat transfer. However, in another embodiment, the cooling fan 40 may operate to push air into the space between the fins 36 to promote convective heat transfer. The electrical regulator 50 supplies 12 volt DC power to the cooling fan 40 and may be mounted to the heat sink 30. In one embodiment, the cooling fan 30 is rated at 15,000 hours, which equals around a 12-13 year life span. However, a cooling fan life span of 20 years or more is contemplated.

Figure 10:
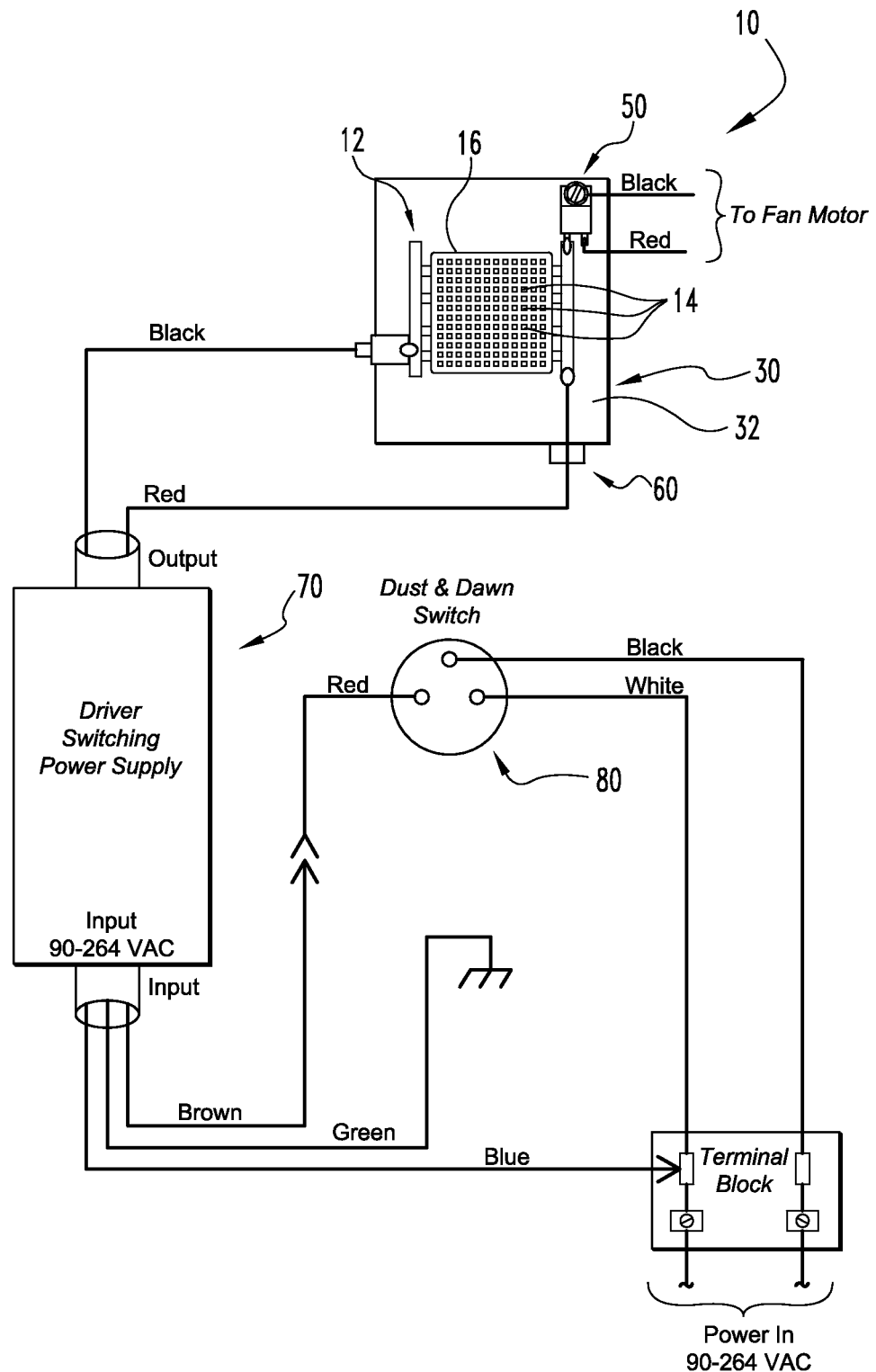
FIG. 10 is an electrical schematic of the LED lighting apparatus illustrated in FIG. 1 according to one form of the present invention.

In one embodiment, the thermal limit switch 60 is mounted to the heat sink 30 and cuts off power to the LED chip 12 if the sensed temperature of the heat sink 30 exceeds a temperature set point, thereby providing thermal protection to the LED chip 12. The thermal limit switch 60 may alternatively be mounted to the board or mounting structure 16 of the LED chip 12, or to other regions of the LED lighting apparatus 10. The LED driver or power supply 70 (FIG. 9) supplies power to the LED chip 12 and the cooling fan 40. In one embodiment, the LED driver 70 is a switching power supply, which is generally more efficient than a conventional LED power supply. The LED driver 70 may be supplied with power from an external power supply within a range of 90-264 VAC, and is rated at 470,000 hours, which equals well over a 100 year life span. As illustrated in FIG. 10, in one embodiment, a light sensor switch 80 may be provided which only provides power to the LED driver 70 during predetermined ambient lighting conditions (e.g., dusk to dawn).

While the present invention has been illustrated and described in detail in the drawings and foregoing description, the same is to be considered as illustrative and not restrictive in character, it being understood that the preferred embodiment has been shown and described and that all changes and modifications that come within the spirit of the invention are desired to be protected.

What is claimed is:

1. An LED lighting apparatus, comprising:
an LED chip including at least one LED mounted thereto;
a light reflector configured to direct light emitted by said LED at a predetermined direction and dispersion angle;
a heat sink including a mounting base and a plurality of cooling fins extending from a first side of said mounting base and with said LED chip secured to an opposite second side of said mounting base;
a cooling fan attached to said heat sink adjacent distal ends of said plurality of fins;
an electrical regulator electrically connected to said cooling fan to provide regulated power to said cooling fan;
an LED driver electrically connected to said LED chip to provide power to said LED chip; and
a thermal limit switch mounted to said heat sink and configured to cut off power to said LED chip if a sensed temperature of said heat sink exceeds a temperature set point to thereby provide thermal protection to said LED chip; and
a light sensor switch configured to provide power to said LED driver during predetermined ambient lighting conditions, wherein said predetermined ambient lighting conditions comprise dusk to dawn conditions.

2. The lighting apparatus of claim 1, wherein the lighting apparatus is incorporated into a street light assembly.

3. The lighting apparatus of claim 1, wherein a combined weight of said LED chip, said light reflector, said heat sink, said cooling fan, said electrical regulator, said thermal limit switch, and said LED driver is less than one pound.

4. The lighting apparatus of claim 1, wherein said heat sink includes a pair of outer mounting legs extending laterally from said mounting base with said plurality of fins positioned between said mounting legs, said outer mounting legs attached to said cooling fan.

5. The lighting apparatus of claim 1, further comprising thermal grease positioned at an interface between said LED chip and said heat sink to facilitate conductive heat transfer therebetween.

6. The lighting apparatus of claim 1, wherein said electrical regulator supplies 12 volt DC power to said cooling fan.

7. The lighting apparatus of claim 1, wherein said LED driver supplies power to said cooling fan.

8. The lighting apparatus of claim 1, wherein said LED driver is a switching power supply.

9. The lighting apparatus of claim 1, wherein said LED driver is supplied with power from an external power supply within a range of 90-264 VAC.

10. The lighting apparatus of claim 1, wherein said LED driver is rated at 470,000 hours.

11. The lighting apparatus of claim 1, wherein said electrical regulator is electrically connected in series between said thermal limit switch and said cooling fan.

12. The lighting apparatus of claim 1, wherein said heat sink includes a pair of outer mounting legs extending laterally from said mounting base with said plurality of fins positioned between said mounting legs, said outer mounting legs attached to said cooling fan, wherein said fins have varying lengths measured from said mounting base, and wherein a length of said fins adjacent each of said outer mounting legs is less than a length of said fins adjacent a central portion of said heat sink.

13. The lighting apparatus of claim 1, wherein said cooling fan cooperates with said heat sink to provide convective heat transfer by drawing air through spaces between said fins to dissipate heat generated by said LED chip.

14. An LED lighting apparatus, comprising:
an LED chip including at least one LED mounted thereto;
a light reflector configured to direct light emitted by said LED at a predetermined direction and dispersion angle;
a heat sink including a mounting base and a plurality of cooling fins extending from a first side of said mounting base and with said LED chip secured to an opposite second side of said mounting base;
a cooling fan attached to said heat sink adjacent distal ends of said plurality of fins;
an electrical regulator electrically connected to said cooling fan to provide regulated power to said cooling fan;
an LED driver electrically connected to said LED chip to provide power to said LED chip; and
a thermal limit switch mounted to said heat sink and configured to cut off power to said LED chip if a sensed temperature of said heat sink exceeds a temperature set point to thereby provide thermal protection to said LED chip;

wherein said heat sink includes a pair of outer mounting legs extending laterally from said mounting base with said plurality of fins positioned between said mounting legs, said outer mounting legs attached to said cooling fan; and wherein said fins have varying lengths measured from said mounting base.

15. The lighting apparatus of claim 14, wherein a length of said fins adjacent each of said outer mounting legs is less than a length of said fins adjacent a central portion of said heat sink.

16. The lighting apparatus of claim 14, further comprising a light sensor switch configured to provide power to said LED driver during predetermined ambient lighting conditions.

17. The lighting apparatus of claim 16, wherein said predetermined ambient lighting conditions comprise dusk to dawn conditions.

18. An LED lighting apparatus, comprising:
an LED chip including at least one LED mounted thereto;
a light reflector configured to direct light emitted by said LED at a predetermined direction and dispersion angle;
a heat sink including a mounting base and a plurality of cooling fins extending from a first side of said mounting base and with said LED chip secured to an opposite second side of said mounting base;
a cooling fan attached to said heat sink adjacent distal ends of said plurality of fins;
an electrical regulator electrically connected to said cooling fan to provide regulated power to said cooling fan;
an LED driver electrically connected to said LED chip to provide power to said LED chip; and
a thermal limit switch mounted to said heat sink and configured to cut off power to said LED chip if a sensed temperature of said heat sink exceeds a temperature set point to thereby provide thermal protection to said LED chip; and
wherein said cooling fan cooperates with said heat sink to provide convective heat transfer by drawing air through spaces between said fins to dissipate heat generated by said LED chip.

19. The lighting apparatus of claim 18, wherein said heat sink includes a pair of outer mounting legs extending laterally from said mounting base with said plurality of fins positioned between said mounting legs, said outer mounting legs attached to said cooling fan, wherein said fins have varying lengths measured from said mounting base, and wherein a length of said fins adjacent each of said outer mounting legs is less than a length of said fins adjacent a central portion of said heat sink.

20. The lighting apparatus of claim 18, further comprising a light sensor switch configured to provide power to said LED driver during predetermined ambient lighting conditions, wherein said predetermined ambient lighting conditions comprise dusk to dawn conditions.

* * * * *